United States Patent [19]
Betts et al.

[11] Patent Number: 5,825,753
[45] Date of Patent: *Oct. 20, 1998

[54] ECHO CANCELER GAIN TRACKER FOR CELLULAR MODEMS

[75] Inventors: William Lewis Betts, St. Petersburg; Edward Sigmund Zuranski, Largo, both of Fla.

[73] Assignee: Paradyne Corporation, Largo, Fla.

[ * ] Notice: This patent issued on a continued prosecution application filed under 37 CFR 1.53(d), and is subject to the twenty year patent term provisions of 35 U.S.C. 154(a)(2).

[21] Appl. No.: 536,917

[22] Filed: Sep. 29, 1995

[51] Int. Cl.$^6$ ........................................................ H04J 3/00
[52] U.S. Cl. ............................ 370/289; 370/269; 370/290; 370/292; 375/222; 375/229; 375/350
[58] Field of Search ..................................... 370/286, 289, 370/290, 291, 292, 267, 268, 269; 375/222, 229, 233, 348, 349, 350

[56] References Cited

U.S. PATENT DOCUMENTS

| | | | |
|---|---|---|---|
| 4,434,438 | 2/1984 | Rzeszewski | 358/167 |
| 4,464,545 | 8/1984 | Werner | 179/170 |
| 4,554,417 | 11/1985 | Boyer | 179/170.2 |
| 4,621,366 | 11/1986 | Cain et al. | 375/8 |
| 5,007,046 | 4/1991 | Erving et al. | 370/32.1 |
| 5,031,194 | 7/1991 | Crespo et al. | 375/348 |
| 5,084,865 | 1/1992 | Koike | 370/291 |
| 5,131,032 | 7/1992 | Esaki et al. | 379/410 |
| 5,206,854 | 4/1993 | Betts et al. | 372/32.1 |
| 5,263,020 | 11/1993 | Yatsuzuka et al. | 370/32.1 |
| 5,526,377 | 6/1996 | Yedid et al. | 375/350 |
| 5,548,642 | 8/1996 | Diethorn | 370/290 |

FOREIGN PATENT DOCUMENTS

| | | | |
|---|---|---|---|
| 0111938 B1 | 6/1984 | European Pat. Off. | H04B 3/23 |
| 0667700 A2 | 8/1995 | European Pat. Off. | H04M 9/08 |

OTHER PUBLICATIONS

United States Patent Application by Robert Earl Scott, entitled "Adaptive Transmit Levels for Modem Operating Over Cellular", Serial No. 08/137542 filed on Oct. 18, 1993.

United States Patent Application by David Goodwin Shaw, entitled "Multistage Echo Canceler Including Time Variation Compensation", Serial No. 08/455385 filed on May 31, 1995.

Patent No. United States Patent Application by Donald D. Duttweiler, entitled "Acoustic Echo Canceler", Serial No. 08/455377 filed on May 31, 1995.

IEEE Transactions On Communications, vol. COM–26, No. 5, May 1978, pp. 647–653, authored by Donald L. Duttweiler, entitled "A Twelve–Channel Digital Echo Canceler".

IEEE Journal On Selected Areas In Communications, vol. SAC–2, No. 2, Mar. 1984, pp. 297–303, authored by Donald L. Duttweiler, C. W. Gritton, Kevin D. Kolwicz and Ying G. Tao, entitled "A cascadable VLSI Echo Canceller".

ICASSP–93, 1993 IEEE International Conference on Acoustics, Speech and Signal Processing, Plenary, Special, Audio, Underwater Acoustics, VLSI, Neural Networks, vol. I of V, Apr. 27–30, 1993, Minneapolis Convention Center, Minneapolis, U.S.A. 93–CH3252–4.

*Primary Examiner*—Hassan Kizou
*Assistant Examiner*—Shick Hom
*Attorney, Agent, or Firm*—Thomas, Kayden, Horstemeyer & Risley

[57] ABSTRACT

A fast response gain tracker operates to adjust the magnitude of an echo cancellation signal. The latter signal is developed from an echo canceler. The fast response gain tracker provides an adjusted echo cancellation signal that is subtracted from an echo-corrupted received signal to provide an echo-canceled signal. In particular, the fast response gain tracker correlates the echo-canceled signal with the echo cancellation signal from the echo canceler. If the gain of the gain tracker is correct the echo is canceled and there is zero correlation between the echo-canceled signal and the echo cancellation signal. However, if the echo level changes then a residual echo component appears in the echo-canceled signal, which now becomes correlated with the echo cancellation signal. In response, the magnitude of the gain tracker automatically adjusts the gain of the echo cancellation signal to match the change in echo level and thereby subsequently eliminates the residual echo.

13 Claims, 2 Drawing Sheets

ECHO CANCELER GAIN TRACKER FOR CELLULAR MODEMS

CROSS-REFERENCE TO RELATED APPLICATIONS

Related subject matter is disclosed in the co-pending commonly assigned, U.S. Patent applications of: Betts et al., entitled "Echo Canceling Method and Apparatus for Data Over Cellular," Ser. No. 08/536,908, filed on Sep. 29, 1995; Betts et al., entitled "Echo Canceling Method and Apparatus for Data Over Cellular," Ser. No. 08/536,916, filed on Sep. 29, 1995.

BACKGROUND OF THE INVENTION

The present invention relates to data communications equipment, e.g., modems, and, more particularly, to echo-canceling modems.

Today, the North American cellular system is predominately an analog system sometimes referred to as AMPS (Advanced Mobile Phone Service). The corresponding cellular communications channel is sometimes referred to as an "impaired channel" since it is affected by a number of channel impairments like Rayleigh fading, co-channel interference, etc., that increase the error rate and, thus, degrade the overall performance of the mobile connection. This is in contrast to a land-line communications channel, where the predominant impairment is additive white gaussian noise (AWGN). Those in the art have realized that one way to improve data transmission rates in the cellular environment is to use a data protocol that is better suited to combating the effects of the cellular environment over the cellular portion of the data connection. One example of a cellular-oriented protocol is the "Enhanced Throughput Cellular" (ETC) protocol, developed by AT&T Paradyne.

Nevertheless, even with a cellular-oriented protocol, impairments in the cellular channel continue to limit the effective data rate over the cellular channel. For example, reliable, i.e., consistent, data transmission over 9600 bits per second (bps) is difficult to maintain.

SUMMARY OF THE INVENTION

Notwithstanding the above-mentioned impairments present in the cellular channel, we have discovered a non-linearity in the cellular AMPS network that has been effecting the ability to reliably maintain cellular data rates over 9600 bps. In particular, when a cellular modem is performing training with a far-end PSTN modem, the cellular AMPS network distorts a far-end echo signal that is used by the cellular modem to train its echo canceler. We estimate that this distortion of the far-end echo signal occurs in approximately 40% of the AMPS cellular infrastructure. The source of the distortion of the far-end echo signal is due to a non-linear compander in some base-station radios and the half-duplex approach that modems use to train echo cancelers. The result is that the echo canceler of the cellular modem is not properly trained thereby causing a residual echo signal to exist. This residual echo signal limits the maximum cellular data rate to 9600 bps (often, this cellular data rate is reduced to 7200 bps.) Without this residual echo signal, the cellular modem and PSTN modem could often achieve a data rate of 14,400 bps (and even higher in the future).

Therefore, and in accordance with the invention, we have developed a method and apparatus for reducing the residual echo signal, which is effectively caused by the above-mentioned distortion of the far-end echo signal during training. In particular, this invention is a fast response gain tracker which operates to quickly adjust the magnitude of the echo cancellation signal of the modem. As a result, this invention eliminates the incorrect training caused by the distortion of the far-end echo signal, thereby providing the ability to reliably maintain cellular data rates greater than 9600 bps.

In an embodiment of the invention, a fast response gain tracker operates to adjust the magnitude of an echo cancellation signal. The latter signal is developed from an echo canceler. The fast response gain tracker provides an adjusted echo cancellation signal that is subtracted from an echo-corrupted received signal to provide an echo-canceled signal. The fast response gain tracker correlates the echo-canceled signal with the echo cancellation signal from the echo canceler. If the gain of the gain tracker is correct the echo is canceled and there is zero correlation between the echo-canceled signal and the echo cancellation signal. However, if the echo level changes then a residual echo component appears in the echo-canceled signal, which now becomes correlated with the echo cancellation signal. In response, the magnitude of the gain tracker automatically adjusts the gain of the echo cancellation signal to match the change in echo level and thereby subsequently eliminates the residual echo.

This approach has an advantage in that it can work with a standard PSTN modem, i.e., no modification is required in the far-end PSTN modem.

DETAILED DESCRIPTION

Figure 1:
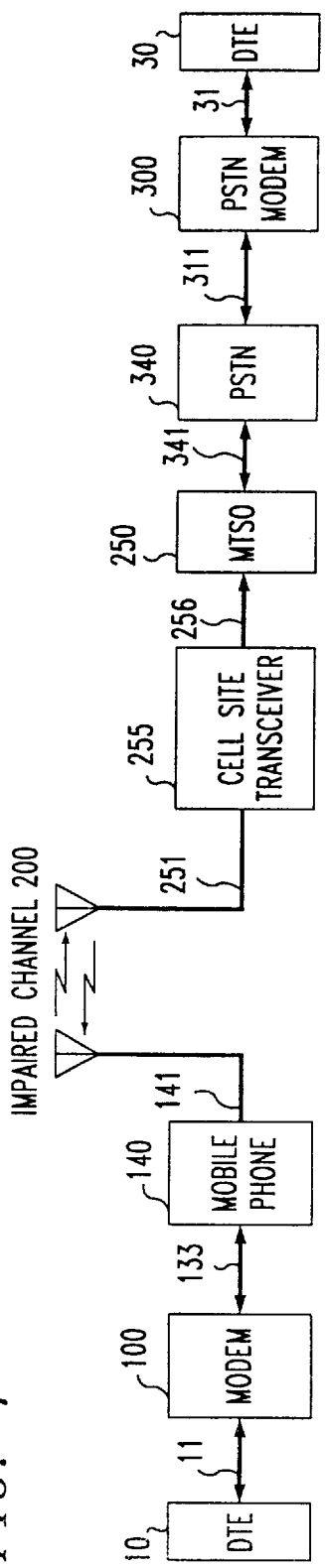
FIG. 1 is a block diagram of a mobile data communications system embodying the principles of the invention.

Other than the inventive concept, the elements of FIG. 1 function as in the prior art and will not be described in detail. FIG. 1 shows a block diagram of a mobile data communications system that includes cellular modem 100, which embodies the inventive concept. As shown, cellular modem 100 is coupled to mobile phone 140 for transmitting data signals to, and receiving data signals from, PSTN modem 300 via cell site transceiver 255, impaired channel 200, Mobile Telecommunications Switching Office (MTSO) 250, and PSTN 340. Both cellular modem 100 and PSTN modem 300 are also coupled to respective data terminal equipment (DTE) 10 and 30.

Before describing the inventive concept, the following is a brief overview of the operation of the mobile data communications system of FIG. 1 once a data connection is established, i.e., after training has been completed. A data signal is applied to cellular modem 100, via line 11, from DTE 10 for transmission to PSTN modem 300. Line 11 represents the signaling, electronics, and wiring, for conforming to a DTE/DCE (data communications equipment) interface standard like EIA RS-232. Cellular modem 100 modulates this data signal as is known in the art to, typically, a quadrature amplitude modulated (QAM) signal, which is provided via line 133 to mobile phone 140. Although not necessary to the inventive concept, it is assumed for the purposes of this example that the modem signal is compatible with International Telecommunications Union (ITU) standard V.32bis. Mobile phone 140 further modulates this transmission signal onto a predefined cellular carrier to provide a cellular data signal to antenna 141. Cell site transceiver 255 receives the cellular data signal via antenna 251 and provides a received modem signal to MTSO 250 for transmission, via public-switched-telephone network 340, to a far-end data endpoint as represented by PSTN modem 300 and DTE 30. Ideally, the data signal received by DTE 30 from PSTN modem 300 is identical to the data signal provided by DTE 10 to cellular modem 100. Transmission of data signals in the opposite direction, i.e., from DTE 30 to DTE 10 occurs in a like fashion.

However, before establishing a data connection, modems, as known in the art, perform a standard sequence of signaling that is also referred to as hand-shaking or training. This signaling determines such parameters as data rate, modulation to use, and trains, or sets, what is known in the art as filter tap coefficient values for filters like echo-cancelers and equalizers, which combat interference and distortion effects caused by the communications channel. As known in the art, the training sequence for an echo canceler is performed half-duplex. Full-duplex training of the echo canceler, while theoretically possible, is not practical from a price/performance viewpoint in the design of data communications equipment.

Figure 2:
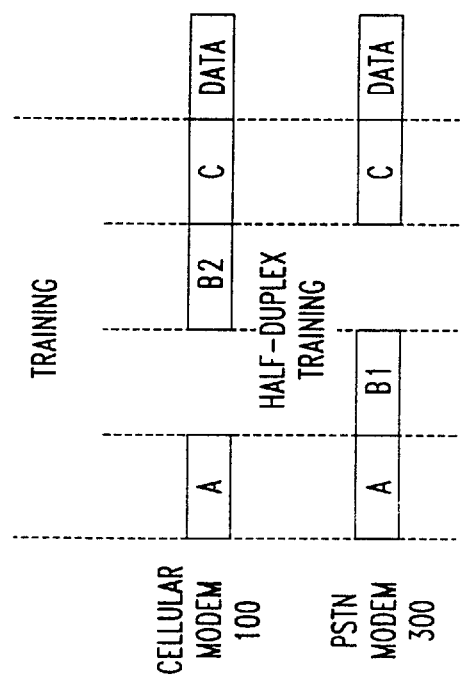
FIG. 2 shows an illustrative portion of a training sequence.

Since different data communications standards like ITU V.32bis and ITU V.34 have different training sequences, a generalized representation of a training sequence is illustrated in FIG. 2. It is assumed that cellular modem 100 is the calling modem and that PSTN modem 300 is the answering modem. As shown in FIG. 2, the training sequence is initially full-duplex during phase "A." The latter is followed by a phase "B," which is half-duplex and is additionally divided into two portions: "B1" and "B2". In portion "B1," of phase "B," the called modem, PSTN modem 300, sends a signal to train the echo canceler of PSTN modem 300 while the cellular modem 100 is silent. Then, in portion "B2," of phase "B," the calling modem, cellular modem 100, sends a signal to train the echo canceler of cellular modem 100 while the far-end PSTN modem is silent. To complete the description of FIG. 2, after half-duplex training phase "B," both modems enter a subsequent full-duplex training phase "C," which is then followed by a "DATA" phase in which data is actually communicated between the two modems.

During the respective half-duplex training portions of phase "B," each modem uses the returned near-echo signal and far-echo signal to adjust the tap coefficients of its near-echo canceler and far-echo canceler, respectively. (It should be noted that other components are also adjusted during training, e.g., equalizer coefficients, etc. However, for the purposes of this example, only the echo canceler training is described.)

In the cellular network, the base station radio—cell site transceiver 255—performs audio processing. One of the audio processing stages is a compander (not shown). The compander is linear over a given signal range. Unfortunately, we have discovered that some companders are not linear in the signal range of the returned far-end echo signal during the half-duplex training phase. The far-end echo signal is a result of subsequent 4-wire to 2-wire signal conversion within the PSTN, as is known in the art. As a result, this non-linearity of the compander results in training the echo canceler of the cellular modem to a distorted far-end echo signal. However, when the cellular modem subsequently goes into full duplex mode, i.e., both transmitting a signal to, and receiving a signal from, the PSTN modem, the received signal level passing through cell site transceiver 255 causes the compander to operate in its linear range. This change in compander operation results in a gain change in the echo path that causes a degradation in echo canceler performance resulting in a large "residual echo" in the cellular modem. In other words, there is a loss of echo cancellation. This residual echo signal limits the maximum cellular data rate to 9600 bps (often, this cellular data rate is reduced to 7200 bps.) Without this residual echo signal, the cellular modem and PSTN modem could often achieve a data rate of 14,400 bps (and even higher in the future).

This problem can be solved by modems with a four-wire interface at the PSTN-side of the cellular data connection. For example, a cellular network that includes a cellular modem pool, as well as "mu-law" modem pools being installed at customer locations solve this problem. Unfortunately, a large number of cellular users will still be calling 2-wire PSTN modems for the foreseeable future. In addition, this problem could be solved by allowing continued adaptation of the echo canceler during data transmission. However, this adaptation process can be slow. Unfortunately, some modems (as represented by cellular modem 100) only adapt during the training sequence to conserve hardware requirements, such as memory, and thereby reduce the cost of the data communications equipment.

Figure 3:
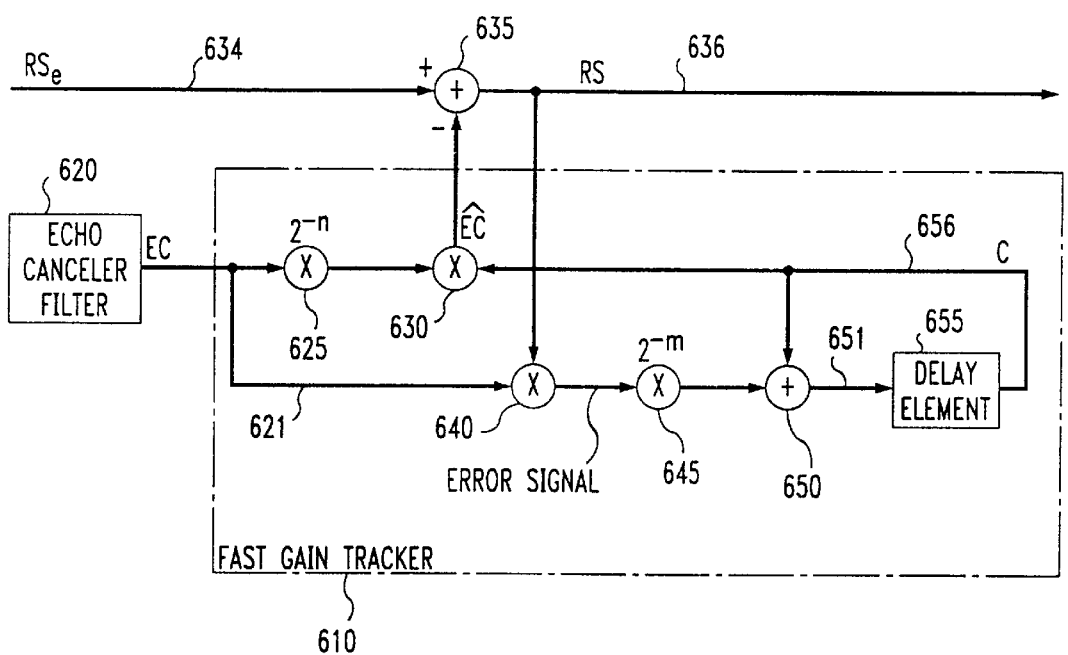
FIG. 3 is an illustrative block diagram of a portion of modem 100 of FIG. 1 embodying the principles of the invention.

Therefore, and in accordance with the invention, we have developed a method and apparatus for reducing the residual echo signal, which is effectively caused by the above-mentioned distortion of the far-end echo signal during training. In particular, this invention is a fast response gain tracker which operates to quickly adjust the magnitude of the echo cancellation signal of the modem. As a result, this invention eliminates the incorrect training caused by the distortion of the far-end echo signal, thereby providing the ability to reliably maintain cellular data rates greater than 9600 bps. In order to facilitate understanding of the inventive concept reference should now be made to FIG. 3, which represents an illustrative block diagram of a portion of cellular modem 100 embodying the inventive concept. Except for the inventive concept (discussed below), the elements of FIG. 3 are well-known and will not be described in detail. For simplicity the inventive concept is only discussed in the context of an "echo signal," independent of whether this is a near, or local, echo signal or a far-echo signal. Therefore, it should be understood that the inventive concept applies to the cancellation of both near, or local, echo signals and far echo signals, and a fast response gain tracker, as illustrated in FIG. 3, would be used for each echo canceler.

As shown in FIG. 3, echo canceler filter 620 provides an echo estimate signal, EC, to fast gain tracker 610. As known in the art, this echo estimate signal, EC, is developed by echo canceler 620 from the locally transmitted signal from cellular modem 100 (not shown in FIG. 3) to approximately cancel any echo signal present in the received signal $RS_e$. For the purposes of this description, it is assumed the received signal, $RS_e$, is a digital form of the received signal, e.g., it has already been processed by a bandpass filter and analog-to-digital (A/D) converter (not shown). In fact, all of the signal paths represent digital samples of signals at discrete time intervals that are illustratively 32 bits wide. Indeed, although illustratively shown as hardware components, it should be realized that the illustrative embodiment of FIG. 3 applies to implementation of the inventive concept in a digital signal processor. Finally, the echo-canceled signal, RS, (described below) is provided on line 636 to other well-known receiver components (not described herein), like an equalizer, slicer, decoder, etc., to eventually recover the data signal transmitted by the far-end modem.

As described above, echo canceler filter 620 is trained during the above-mentioned half-duplex training phase, as illustratively shown in FIG. 2. As a result of this training, the values of the tap coefficients (not shown) of echo canceler filter 620 are set to initial values. In addition, as mentioned above, echo canceler filter 620 does not adapt subsequent to the half-duplex training phase, i.e., the values of the tap coefficients, once set, do not change. As a result, if the compander (not shown) of cell site transceiver 255 of FIG. 1 has the above-mentioned non-linearity, then—once full-duplex transmission begins—the compander moves into its linear range of operation causing a gain change in the echo path, which means the echo estimate signal, EC, is wrong, and a large residual echo signal is now present limiting the effective data rate. However, and in accordance with the inventive concept, fast gain tracker 610 modifies the magnitude of echo estimate signal, EC, to better approximate the level of the echo signal present in the received signal, $RS_e$. As a result, the residual echo signal component of echo-canceled signal, RS, is significantly reduced, if not eliminated.

Fast gain tracker 610 comprises multipliers: 625, 630, 640, and 645, adder 650 and delay element 655. The latter is representative of a 32 bit register that is clocked (not shown), or updated, at an illustrative rate of equal to the sample rate of the echo canceler. For example, 7200 Hz for a V.32bis modem, which uses a symbol rate of 2400 symbol/sec. Every clock cycle, delay element 655 is updated with a new 32 bit value from adder 650. Initially, the value of delay element 655 is set equal to 1.

After training, the magnitude of echo estimate signal, EC, is adjusted, in accordance with the invention, to remove any increase in residual echo. In particular, multiplier 625 prescales echo estimate signal EC by $2^{-n}$. This prescaling is used to give a constant attack time to fast gain tracker 610. Otherwise, for large echoes, gain tracker 610 will change the magnitude of echo estimate signal EC erratically in response to normal signal variations. Such variation will decrease the signal-to-noise ration (SNR). The output of multiplier 625 is applied to multiplier 630 which, in accordance with the invention, multiplies the prescaled echo estimate signal with the output of delay element 655, C, to provide an adjusted echo cancellation signal, to adder 635. The latter subtracts the adjusted echo cancellation signal, $\hat{E}\hat{C}$, from the received signal $Rs_e$, to provide echo-canceled signal RS.

In order to dynamically, and quickly, adjust the value of $\hat{E}\hat{C}$ to compensate for any increase in residual echo, e.g., as caused by the above-mentioned non-linearity of a network compander, the output of delay element 655, C, is adjusted as follows. The echo estimate signal, EC, provided by echo canceler filter 620, is multiplied times the echo-canceled signal, RS. The output signal of multiplier 640 is an error signal that is representative of whether or not there is residual echo present in the echo-canceled signal, RS. In particular, if there is little, or no, residual echo present in echo-canceled signal RS, the correlation between the two signals should be zero and the mean value of the error signal should be zero. However, if residual echo is present in echo-canceled signal RS, then the average value of the error signal is different from zero. The error signal is provided to multiplier 645, which scales the error signal by $2^{-m}$ to provide some stability to fast gain tracker 610. It should be realized by those skilled in the art that fast gain tracker 610 is an "infinite impulse response" (IIR) filter and not a finite impulse response (FIR) filter. Echo canceler filter 620 is representative of an FIR filter in which the impulse response is fixed as determined by the above-mentioned tap coefficients. In contradistinction, the feedback via adder 650 of fast gain tracker 610 provides an infinite impulse response and therefore provides some concerns for stability—and the presence of multiplier 645 to scale the error signal. It should be noted that the use of an IIR filter structure for fast gain tracker 610 provides a fast response in comparison to an FIR filter structure which typically responds, or adapts, slower, e.g., via the use of a least-means-squared (LMS) adaptation algorithm. The scaled error signal provided by multiplier 645 is added to the output of delay element 655 by adder 650, which forms the input to delay element 655 on the next clock cycle. As a result, it can be observed that any change in the residual echo of echo-canceled signal RS results in a subsequent change in the value of C and, concomitantly, adjusts the magnitude of echo estimate signal EC. For example, once the above-mentioned compander enters its linear mode of operation and there is an increase in residual echo, fast gain tracker 610 correspondingly adjusts the magnitude of echo estimate signal EC to subsequently remove the residual echo.

The output, C, of delay element 655 is equal to:

$$C=C+2^{-m}(EC)(RS), \tag{1}$$

where m has been empirically determined to be equal to:

$$m=K-(NE/3)+n, \tag{2}$$

where K is a constant, for example 9, NE is the echo magnitude in dB and is determined during training as known in the art, and n is a constant within the modem used to prescale the echo by $2^{-n}$, as described above. The value of n is determined during training to scale the output of echo canceler 620 to approximate the echo in the received signal and is typically equal to value on the order of 1, 2, 3, etc. The example value of K=9 will track a 3 dB change in echo magnitude within 20 seconds and causes SNR variation between 35 and 38 dB. The attack time of the gain tracker is adjustable. In some tests a 3 dB change in echo has been corrected within one second but with reduced SNR. The preferred attack time allows 20 seconds to achieve a 35 dB SNR following a 3 dB change in echo level. On channels where the SNR is less than 30 dB the attack time can be reduced.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the invention is illustrated herein as being implemented with discrete functional building blocks, e.g., an echo canceler, etc., the functions of any one or more of those building blocks can be carried out using one or more appropriate programmed processors, e.g., a digital signal processor.

In addition, although the inventive concept was described in the context of a cellular data connection this invention is applicable to other situations in which electronic equipment distorts the far-end echo signal. In particular, any gain change in the echo path after training the echo canceler causes a degradation in echo canceler performance. For example, it has also been discovered that some digital access arrangement (DAA) hybrids have a time-varying gain that changes the received echo level causing residual echo distortion. Also, although the inventive concept was described in the context of a calling modem, the inventive concept also applies to a called modem.

Finally, the inventive concept is also applicable to an echo canceler that adapts in the data phase, since, typically, the echo canceler adapts too slowly to the changes in the echo signal.

What is claimed:

1. Data communications equipment apparatus comprising:
   a filter for echo canceling that provides an echo estimate signal;
   an amplifier comprising an infinite impulse response filter, said amplifier configured to adjust the magnitude of the echo estimate signal as a function of an amount of correlation between the echo estimate signal and an echo-canceled signal to provide an adjusted echo estimate signal, said amplifier including first multiplication means for multiplying said echo estimate signal with said echo-canceled signal; and
   a means for combining a received signal with the adjusted echo estimate signal to provide said echo-canceled signal, while the data communications apparatus is operating in a data transfer mode.

2. The apparatus of claim 1 wherein the amplifier further comprises:
   a second multiplication means that scales the error signal to provide a scaled error signal;
   a register for storing an adjustment factor;
   an adder for adding the adjustment factor to the scaled error signal to provide an input signal representative of this sum to the register;
   a third multiplication means that scales the echo estimate signal to provide a scaled echo estimate signal;
   a fourth multiplication means that multiplies the scaled echo estimate signal with the adjustment factor to provide the adjusted echo estimate signal;
   wherein the register is updated on a periodic basis with the sum to change the adjustment factor; and
   wherein said first multiplication means that multiplies the echo estimate signal and the echo-canceled signal provides an error signal representing the amount of correlation between the echo-canceled signal and the echo estimate signal.

3. The apparatus of claim 1, wherein the filter does not adjust said magnitude of said echo estimate signal subsequent to a half-duplex training sequence that initializes a set of tap coefficients of the filter.

4. Data communications equipment apparatus comprising:
   a filter for echo canceling that provides an echo estimate signal;
   an infinite impulse response filter that adjusts the magnitude of the echo estimate signal to provide an adjusted echo estimate signal during a period in which data transfer is occurring, said infinite impulse response filter including first multiplication means for multiplying said echo estimate signal with an echo-canceled signal; and
   a means for combining a received signal with the echo adjusted estimate signal as a function of an amount of correlation between the echo estimate signal and the echo-canceled signal to provide an echo-canceled signal.

5. The apparatus of claim 4 wherein the infinite impulse response filter further comprises:
   a register for storing an adjustment factor;
   an adder for adding the adjustment factor to the error signal to provide an input signal representative of this sum to the register;
   a second multiplication means that multiplies the echo estimate signal with the adjustment factor to provide the adjusted echo estimate signal;
   wherein the register is updated on a periodic basis with the sum to change the adjustment factor; and
   wherein said first multiplication means that multiplies the echo estimate signal and the echo-canceled signal provides an error signal representing the amount of correlation between the echo-canceled signal and the echo estimate signal.

6. The apparatus of claim 5 wherein the first multiplication means further comprises a means for scaling the error signal to provide a scaled error signal to the adder.

7. The apparatus of claim 5 wherein the second multiplication means first scales the echo estimate signal before multiplication with the adjustment factor.

8. The apparatus of claim 4, wherein the filter does not adjust said magnitude of said echo estimate signal subsequent to a half-duplex training sequence that initializes a set of tap coefficients of the echo canceler.

9. A method for use in data communications equipment apparatus to quickly reduce a residual echo signal, the method comprising the steps of:
   training an echo canceler during a training sequence;
   receiving an echo-corrupted data signal from a communications channel during a data phase of a data connection with a far-end data communications equipment;
   generating an echo estimate signal:
   adjusting, using an infinite impulse response filter, a magnitude of the echo estimate signal by an adjustment factor; and
   subtracting the adjusted echo estimate signal from the received echo-corrupted signal to provide an echo-canceled signal;
   wherein said infinite impulse response filter includes a first multiplier for multiplying said echo estimate signal with said echo-canceled signal.

10. The method of claim 9 where the adjusting step further comprises the steps of:
    providing a register for storing an adjustment factor;
    adding the adjustment factor to the error signal to provide an input signal representative of this sum to the register;
    multiplying, in a second multiplier, the echo estimate signal with the adjustment factor to provide the adjusted echo estimate signal; and
    updating the register with the sum on a periodic basis with the sum to change the adjustment factor;
    wherein said first multiplier for multiplying said echo estimate signal with said echo-canceled signal provides an error signal representing the amount of correlation between the echo-canceled signal and the echo estimate signal.

11. The method of claim 10 wherein the step of multiplying, in said second multiplier, the echo estimate signal with the adjustment factor first scales the echo estimate signal before multiplication with the adjustment factor.

12. The method of claim 10 wherein the step of multiplying, in said first multiplier, the echo estimate signal and the echo canceled signal first scales the error signal and said adding step of claim 10 adds the adjustment factor to the scaled error signal to provide the input signal representative of the sum.

13. The method of claim 9, further comprising the step of inhibiting the echo canceler from adjusting said magnitude of said echo estimate signal during the data phase.

* * * * *